United States Patent
Alcordo

[11] Patent Number: 5,853,460
[45] Date of Patent: Dec. 29, 1998

[54] AIR PURIFIER USING PLANT ROOT INTERACTION

[76] Inventor: Isabelo S. Alcordo, 613 E. Summit St., Wauchula, Fla. 33873

[21] Appl. No.: 800,231

[22] Filed: Feb. 21, 1997

Related U.S. Application Data

[63] Continuation of Ser. No. 668,995, Mar. 13, 1991, abandoned.

[51] Int. Cl.⁶ .................................................. B01D 53/04
[52] U.S. Cl. ............................ 96/134; 55/279; 55/385.1; 96/135; 96/136
[58] Field of Search ................................. 55/385.1, 279; 96/134, 135, 136, 140; 95/90

[56] References Cited

U.S. PATENT DOCUMENTS

| | | | |
|---|---|---|---|
| 3,999,329 | 12/1976 | Brais | 55/269 |
| 4,016,677 | 4/1977 | Julinot | 47/64 |
| 4,231,379 | 11/1980 | Kohori | 131/235 R |
| 4,660,579 | 4/1987 | Horsewell et al. | 131/339 |
| 4,732,591 | 3/1988 | Tujisawa et al. | 96/135 |
| 5,089,036 | 2/1992 | Hawes | 55/227 |
| 5,127,187 | 7/1992 | Hattori et al. | 47/59 |
| 5,168,664 | 12/1992 | Deutschmann, Sr. | 47/79 |
| 5,190,570 | 3/1993 | He | 55/279 |
| 5,397,382 | 3/1995 | Anderson | 96/135 |
| 5,407,470 | 4/1995 | Jutzi | 96/135 |

*Primary Examiner*—Duane S. Smith
*Attorney, Agent, or Firm*—Frank A. Lukasik

[57] ABSTRACT

The invention is an air filtration and purification system, utilizing the filtering ability of the various elements in a potting medium for plants, water films and free water surface in contact with the roots of these plants, and the power of live plants to assimilate various odors, pollutants and in combination with commercially available air filter materials, such as activated charcoal, and other specialized granular air filter materials, to meet many air filtration requirements. The system consists of a unique flower pot, with a potting medium cavity for specially formulated potting medium which permits the free flow of ambient air upon application of a partial vacuum, and sustains the normal growth of the plant in the flower pot, and a built-in filter chamber, which is adaptable to any commercially available granular air filter material. Application of a vacuum condition in the filter chamber purges the micro and macro pores in the potting medium, causing the ambient air to flow into the medium, facilitating an active and turbulent interaction at the micro level in the pores, between the pollutants in the air stream and the various filter elements in the flower pot. The interactions also filter out radon gas, and also its short lived progenies and their long lived decay products.

2 Claims, 4 Drawing Sheets

AIR PURIFIER USING PLANT ROOT INTERACTION

RELATED APPLICATIONS

This application is a continuation of Ser. No. 07/668,995, Filed Mar. 13, 1991, now abandoned.

BACKGROUND OF THE INVENTION

This invention relates to an apparatus for purifying air in houses, buildings, and other enclosed structure by combining the purifying action of live plants, elements in the rooting medium, water and water films on the potting medium particles, and on the roots of live plants, ordinary and activated charcoal, and other absorbents, and adsorbents, on air, and also providing a convenient, attractive, and decorative receptacle for house plants, wherein the interactions between the air, and the filter elements mentioned can effectively occur to maximize the filtration effect.

The interior air of homes contain many pollutants, including dusts, tobacco smoke, and residuals, organic and inorganic chemical vapors from interior building materials, decorative preservatives, such as paints, and varnishes, and from foods. Recently, the recognition of ambient atmospheric radon gas in homes as one of the causes of lung cancer has intensified the introduction of some very elaborate methods of filtering out these unwanted and dangerous pollutants from homes, school rooms, offices, and other enclosed structures. It has become customary to install air filters of various types in homes in order to filter these various pollutants out of the air, especially for those occupants who are sensitive or allergic to them. These filters are of all types, shapes and materials, and are normally designed for specific purposes, such as odor removing, smoke removing, and dust removing.

For radon gas, the main approach has been the installation of special plastic shields under the floors of houses, which are laid on ground during construction, and on which the concrete is poured for the concrete flooring. This procedure is intended to provide a solid shield under the house, impenetrable to the radon gas. However, during pouring of the concrete, setting of the forms, and installation of the supports for reinforcing bars, the plastic shield can be punctured. In older houses, the concrete floors may crack, causing breaks, not only in the concrete, but also in the plastic shields. Any break, or puncture, in these shields allows radon gas to build up in the inside of the house.

Horsewell, in U.S. Pat. No. 4,660,579 introduces and describes a filter element to extract smoke particles from a cigarette, or cigar. This art has led to the smoke eater type of filter, where a vacuum is created around the filter, and smoke is drawn into the filter, where a positive filtering shield, such as the art of Horsewell, collects the tobacco residue, and smoke, inside the filter apparatus. These apparatuses will filter smoke and minute particles from the air, but will not filter out the gases, and are therefore only partially effective.

Many other approaches to eliminating gases, particles, and odors from the air in houses and buildings have been submitted as prior art devices, however, none of these prior art devices studied really act as a complete filter.

SUMMARY OF THE INVENTION

Accordingly, it is an object of this invention to provide an air filtration device with a total filter effect for houses, buildings, and other enclosed structures. This filtering device combines the filtering action of the roots of live plants, of silicate clay minerals in the rooting medium of plants, of free water and surface water films in the macro, and micro pores, formed with proper mixtures of potting medium elements, of ordinary and activated charcoal, and of other air filter materials, which may be called for to meet specific environmental requirements.

Another object of this invention is to provide a container, or receptacle, wherein the interactions between the various filter elements mentioned, and the ambient air, can occur with maximum effect for more complete filtration. The container, or receptacle, may be of any size, shape, form, construction, or material. It may be movable, or built into houses, buildings, or structures, during, or after construction.

DETAILED DESCRIPTION OF THE INVENTION

Figure 1:
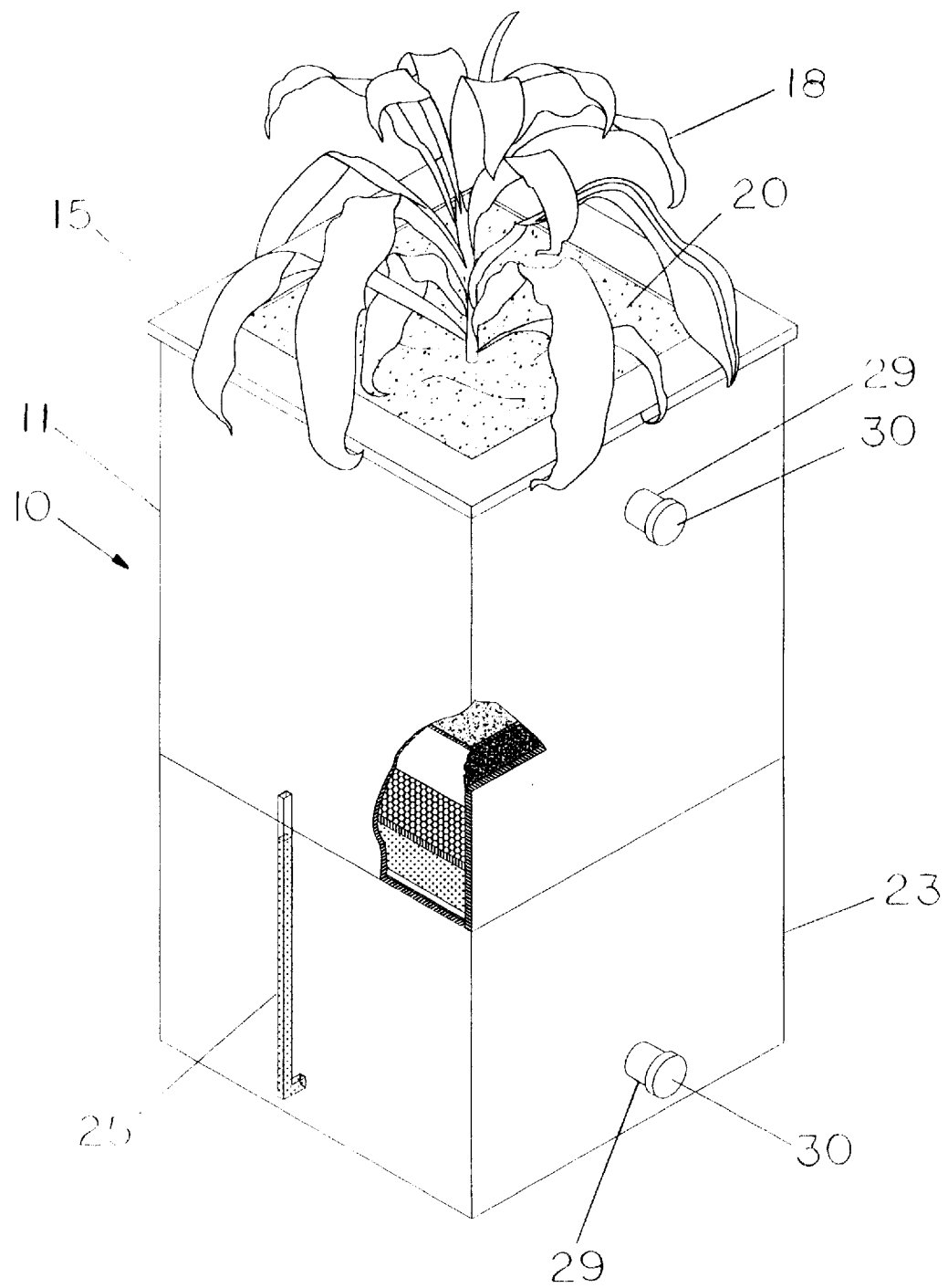
FIG. 1. is a top perspective view, partially in section, of the flower pot in accordance with the invention.
Figure 2:
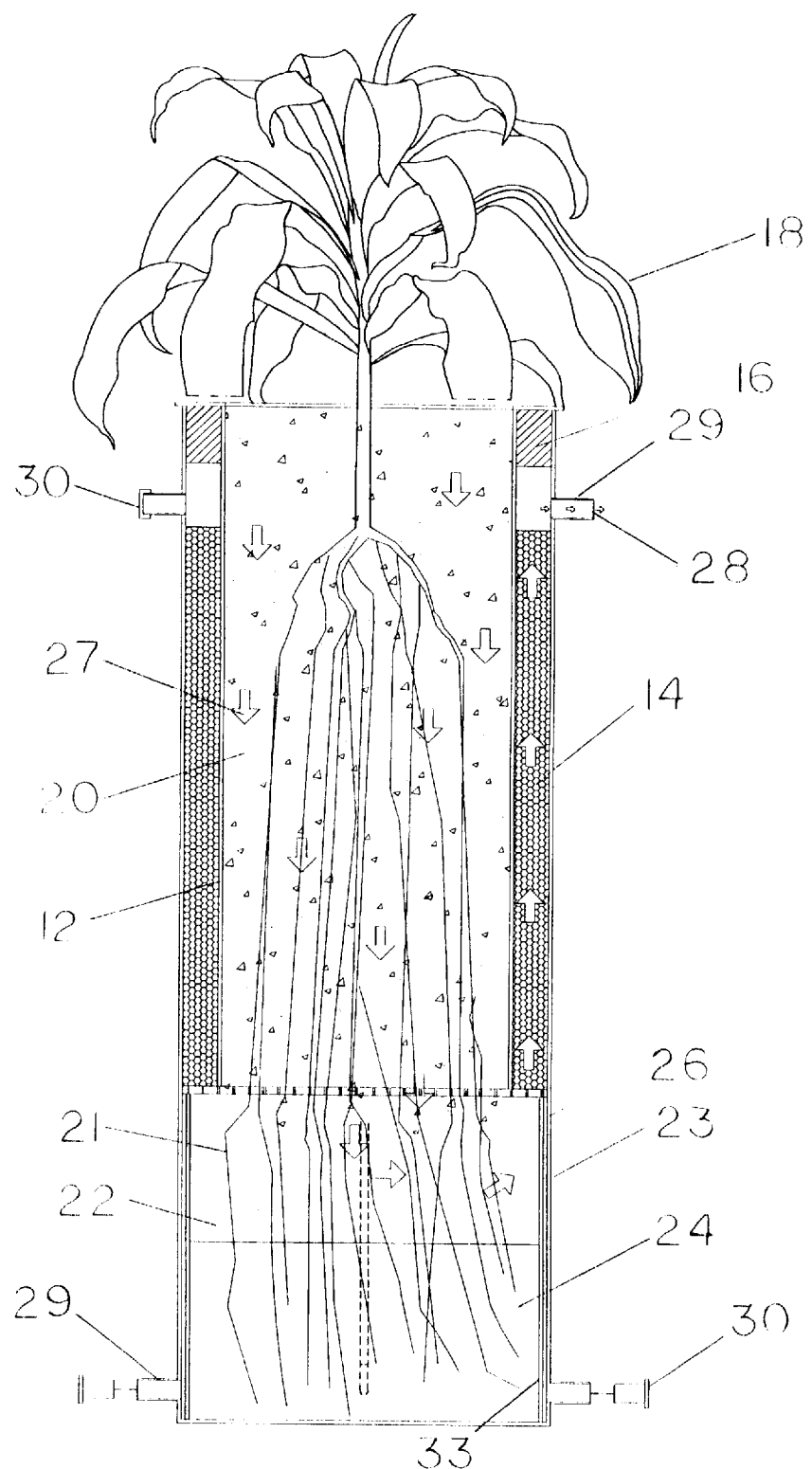
FIG. 2. is a sectional side view of the flower pot in accordance with the invention.

In carrying out this invention in the illustrative embodiment thereof, a receptacle, container, or canister, more commonly known as a flower pot 10, is provided with an outer wall 11, and an inner wall 12, with a dry filter chamber 13, between the two walls to form a two walled container, or a container within a container. The two containers are of the same height, open at both ends, with the two walls connected to perforated plate 19 at specific locations to form a stable, single unit. Seal bottom 33 is also attached to the perforated plate 19 at its bottom surface thereby forming a single unit rooting chamber 22. The base reservoir 32 is the third unit of the flower pot 10. When the rooting chamber 22, formed by inner wall 12, the perforated plate 19 and seal bottom 33 is inserted into the base reservoir 32, protrusions 26 and 36 form an air tight seal with the wall 37 of reservoir 32.

One purpose of the dry filter chamber 13 between the two walls is to house one of several types of filter materials 14, formulated to achieve desired air filtration goals. It is therefore called the dry filter chamber 13. Another purpose of the dry filter chamber 13 is to provide a chamber which can be made air tight, where a negative atmosphere can be applied to create a partial vacuum to draw ambient air through the chamber.

The upper open end of the filter chamber 13 is then covered, using a seal top 15, made to fit tightly into the cavity of the dry filter chamber 13 between the two walls 11 and 12 of the flower pot 10, forming a seal 16 at the top of the two walls. A potting space 17, formed by the inner wall 12, allows for planting of a house plant 18, or other foliage. Inside the potting space 17, near the bottom, is a perforated plate 19. This perforated plate 19, is formed to fit at the bottom of the potting space 17, and has the purpose of holding the potting medium 20 in the flower pot 10, and also allowing the small roots 21 of the plant to grow through the perforated plate 19, and extend down into the rooting chamber 22 below. The perforated plate 19 also functions for the easy removal of the plant 18 out of the flower pot 10 to trim out aging roots, now and then, to induce the plant to produce new and physiologically active root masses.

The open bottom end of the two walled container is sealed by a bottom cover 23, constructed to serve also as a water pan, or reservoir 24. The reservoir 24 has a water drain hole 25, located such as to control the maximum level of water in the two walled flower pot 10. The bottom cover 23 is sealed onto the two walled container, using a plug in type protrusion 26, part of the bottom cover 23, and dimensioned such as to fit snugly into the opening 34 between the two walls of the flower pot 10. With both the upper and lower end of the cavity between the two walls closed, an air tight filter chamber 13 is formed, where a negative atmosphere can be applied, to draw ambient air through the flower pot 10.

This ambient air, shown by arrows 27, filled with pollutants, is drawn out at the upper end of the outer wall 11 of the flower pot 10, using air outlet holes 28, which are provided with a nozzle 29, and a nozzle cap 30. The caps 30, on one or more of these nozzles 29 are rotatably removed, and these open nozzles 29 are connected to a vacuum pump (not shown), and, as the flower pot 10 is designed with a routing for this ambient air 27 through the structure of the flower pot, ambient air 27 is forced to travel through the entire filtering structure of the flower pot 10.

This filter structure of the flower pot utilizes the vacuum condition that develops, and ambient air 27 is sucked through the flower pot 10, and first interacts with the plant potting medium 20, the plant roots 21, and then passes through a plurality of holes 31 in the perforated plate 19 of the flower pot 10, and into the filter chamber 13 between the walls 11 and 12 of the flower pot 10, and interacts with the dry filter materials 14 contained within, such as charcoal, and activated charcoal, filtering the moist air stream, and retaining any remaining pollutants.

Figure 3:
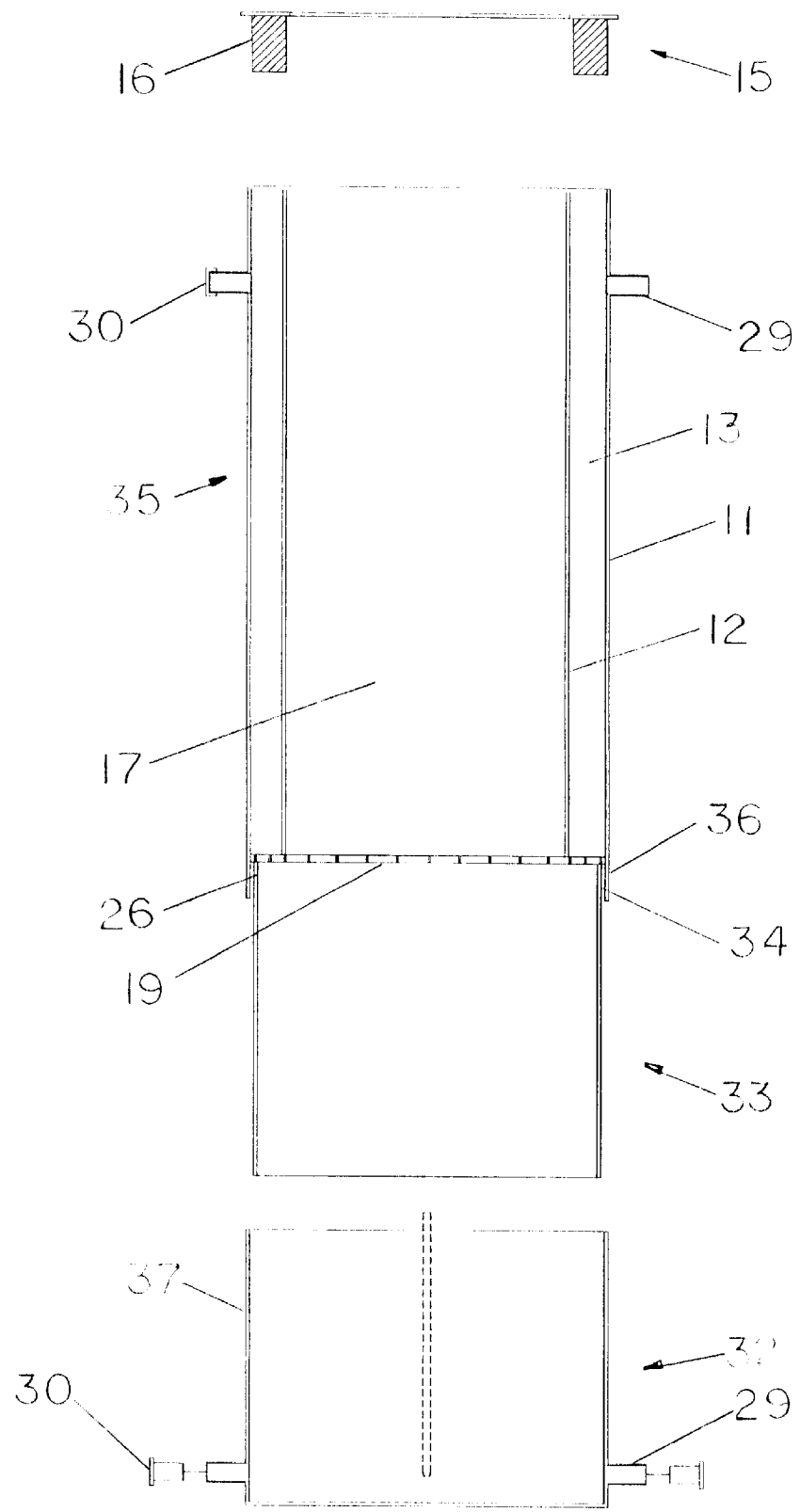
FIG. 3. is an exploded view, in section, of the flower pot in accordance with the invention.
Figure 5:
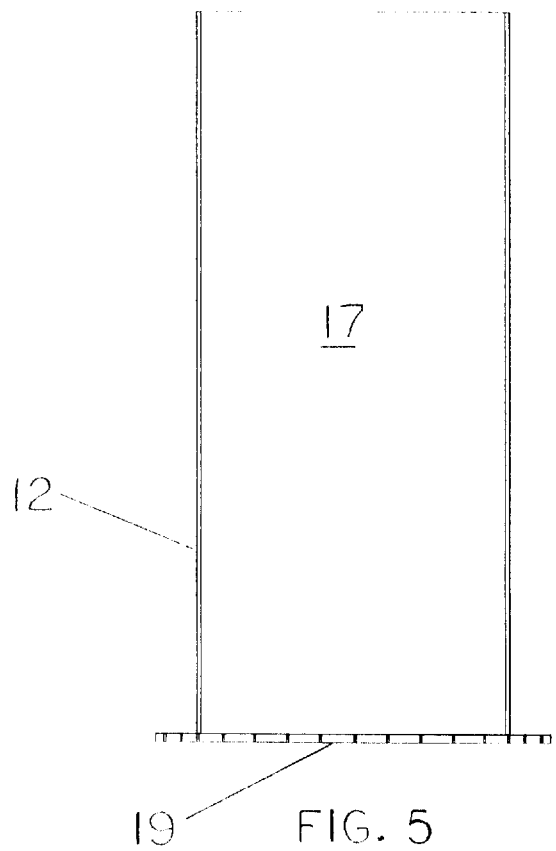
FIG. 5 is a side sectional view of the inner wall in accordance with the invention.
Figure 4:
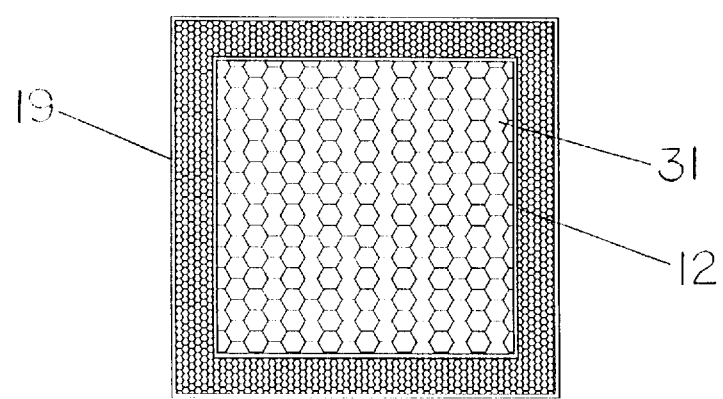
FIG. 4. is a top view of the perforated plate in accordance with the invention.

The flower pot 10 may be made of any suitable material, size, or shape and decorated in any manner. As depicted in FIG. 3, there is an exploded view of the flower pot 10 consisting of three parts, that is, the top seal 15, air chambers 35, and reservoir 24. Attached to the water reservoir 24, is a water level indicator 25 and a plurality of holes, protrusions 26, for draining off excess water before such water could rise to the perforated plate 19, thus creating an obstruction to the flow of air through this filtering system, and covered by nozzle caps 30 when not in use.

The washed rooting chamber 22 being formed between the underside of perforated plate 19, and the free water surface, such washed root chamber 22 allowing for the roots 21 of the plant 18, through the holes 31 in the perforated plate 19, and into this washed rooting chamber 22, and on into the water in the reservoir 24, thus allowing for a film of water to be formed around these roots 21, and for droplets of water to be formed onto these roots, such water film and droplets being below the perforated plate 19 and above the water level created in the reservoir 24, such water film and water droplets being a major part of the filtering system created by this unique flower pot 10.

As discussed above, the introduction of this filtering device takes place by filling the chamber 17 with a potting medium 20, filling the dry filter chamber 13 with charcoal, activated charcoal, or some other filtering medium, and planting a flower or other plant in the potting medium 20. When a vacuum condition is created in this flower pot 10 by connecting a vacuum hose (not shown) onto one of the nozzles 29, the other nozzles 29 being capped off by caps 30, a flow of ambient air is caused to travel down through the potting medium 20 in the chamber 17, through the perforated plate 19, circulate around the roots 21 of the plant 18, such roots 21 being in the rooting chamber 22, up through the dry filter chamber 13 and out through an uncapped nozzle 29 and thus into the atmosphere in a very unique filtered condition.

The theory behind this filtering process is based on the different materials working together inside the flower pot. Plant potting medium is normally composed of very fine materials, such as the silicate clay minerals, and course pebble size materials, such as perlite, and charcoal, and organic matter, such as sphagnum moss. The silicate clay minerals, such as vermicullite, and montmorillonite, because of the extreme fineness of their particles, and expanding type structure, could have as much as 800 square meters of surface area per gram of material. And because of ionic substitution in the crystal lattice of these minerals, the surfaces develop negative charges. The organic matter, such as sphagnum moss, besides having large negative charges, also soak in water like a sponge, to keep the potting medium moist. Some materials, through man induced processes, develop intricate micro, and macro channels within the pebble size grains, the most common of which are ordinary and activated charcoal, and perlite. Mixtures of these extremely fine silicate clay minerals, and organic matter, pebble size charcoal, perlite, and quartz sand, for use as potting medium, will be prepared for use in this invention, which permit the polluted air stream to flow through these small media with a living plant growing in the medium.

By creating a vacuum inside the flower pot, by the use of a vacuum pump connected to one, or more of the nozzles of the flower pot, ambient air can be made to flow through the flower pot, into the potting medium. In the potting medium, the air stream passes through root channels, and through zigzagging, intricate, complex networks of macro, and micro pores, formed by the particles of the elements of the potting medium, the walls of which are covered with water films, provided by the water in the reservoir, by evaporation, and capillary flow. The pollutants in the air stream strike into these water films, which could be several hundred square meters in area. Now because water molecules are dipolar, charged particles in the airstream, these particles being either organic, or inorganic, particulate, molecular, or ionic, are first slowed down, and eventually immobilized, or, that is, filtered out from the air stream.

Once immobilized, the organic molecules are broken down by microorganisms in the roots and assimilated into the plant tissue. This process is of particular importance in the case of radon, and its progenies. Radon gas is soluble in water. Within 3–7 days, one half of the original concentration of radon gas decays into polonium 218, lead 214, bismuth 214, and polonium 214. These cancer causing, short lived progenies are positively charged, so that, whether formed in ambient air, or in water films, they are effectively immobilized by the negatively charged surfaces of the various elements in the potting medium.

In time, they are absorbed by the roots, which re-activate the charged surfaces to do more filtering of the air stream. The moist filtered air stream then exits from the root zone, through the perforations in the plate, where it is further filtered by the root mass that forms between the plate and the free water surface. The air stream then passes through the air holes in the inner wall into a dry filter pack or column, made of ordinary and activated charcoal. Other specialized materials may also be used in this cavity to achieve special environmental requirements.

Accordingly, a very unique, attractive, convenient method of filtering and purifying the ambient air in a room is provided, and this air flowing over and around the roots of the flower, with the water modules attached to these roots, creates a physio-chemical reaction, which further purifies the ambient air. Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalent to the claimed elements.

What is claimed is:

1. An air filtration and purifier system using indoor plants, filter material, water, and a vacuum source, said system comprising:

a center section having an inner wall, an outer wall, a seal bottom and a perforated plate, said perforated plate having an upper surface, a lower surface, and an outer surface, said inner wall affixed to said perforated plate on said upper surface and said outer wall being affixed to said outer surface and thereby forming a filter chamber and a potting space, said seal bottom being affixed to said lower surface of said perforated plate thereby forming a rooting chamber, said outer wall having a protrusion extending downwardly to a point below said perforated plate for forming a sealing joint, a reservoir for holding a water supply, said reservoir having a chamber for storing a supply of water and a protrusion extending upwardly for engaging said sealing joint, and having a plurality of nozzles for draining said reservoir, and said center section and said reservoir being joined with said protrusions and thereby forming an air tight sealing joint, and a top seal having a center opening and a depending seal, said seal being inserted within said filter chamber and thereby providing an air tight seal between said inner wall and said outer wall and said center opening providing access for said potting space, and said outer wall having a plurality of nozzles affixed to said outer wall at a point near said top seal for applying a vacuum suction to said center section whereby air is circulated through the purifying system.

2. An air filtration and purifier system using indoor plants, filter material, water, and a vacuum source, said system comprising:

a center section having an inner wall, an outer wall, a seal bottom and a perforated plate, said perforated plate having an upper surface, a lower surface, and an outer surface, said inner wall affixed to said perforated plate on said upper surface and said outer wall being affixed to said outer surface and thereby forming a filter chamber and a potting space, said seal bottom being affixed to said lower surface of said perforated plate thereby forming a rooting chamber, said filter chamber being filled with a dry filter material selected from the group consisting of charcoal, and activated charcoal, said potting space being filled with a very fine potting medium selected from the group consisting of silicate clay and course pebble size materials consisting of perlite, charcoal, and sphagnum moss, said outer wall having a protrusion extending downwardly to a point below said perforated plate for forming a sealing joint, a reservoir for holding a water supply, said reservoir having a chamber for storing a supply of water and a protrusion extending upwardly for engaging said sealing joint, and having a plurality of nozzles for draining said reservoir, and said center section and said reservoir being joined with said protrusions and thereby forming an air tight sealing joint, and a top seal having a center opening and a depending seal, said seal being inserted within said filter chamber and thereby providing an air tight seal between said inner wall and said outer wall and said center opening providing for said potting space, and said outer wall having a plurality of nozzles affixed to said outer wall at a point near said top seal for applying a vacuum suction to said center section whereby air is circulated through the purifying system.

* * * * *